(12) United States Patent
Jones

(10) Patent No.: US 8,750,000 B2
(45) Date of Patent: Jun. 10, 2014

(54) METHOD OF ADAPTING A CONFIGURATION OF A VOLTAGE CONVERTING DEVICE AND VOLTAGE CONVERTING UNIT FOR A VOLTAGE CONVERTING DEVICE

(75) Inventor: Rodney Jones, Stoke on Trent (GB)

(73) Assignee: Siemens Aktiengesellschaft, München (DE)

( * ) Notice: Subject to any disclaimer, the term of this patent is extended or adjusted under 35 U.S.C. 154(b) by 417 days.

(21) Appl. No.: 13/318,538

(22) PCT Filed: Sep. 18, 2009

(86) PCT No.: PCT/EP2009/062134
§ 371 (c)(1),
(2), (4) Date: Nov. 2, 2011

(87) PCT Pub. No.: WO2010/127720
PCT Pub. Date: Nov. 11, 2010

(65) Prior Publication Data
US 2012/0057384 A1 Mar. 8, 2012

Related U.S. Application Data

(60) Provisional application No. 61/176,159, filed on May 7, 2009.

(51) Int. Cl.
*H02M 7/5387* (2007.01)
(52) U.S. Cl.
USPC .......................................................... 363/71

(58) Field of Classification Search
USPC ..................................................... 363/65, 71
See application file for complete search history.

(56) References Cited

U.S. PATENT DOCUMENTS

| | | | | |
|---|---|---|---|---|
| 5,999,428 | A * | 12/1999 | Dahler et al. | 363/71 |
| 6,437,996 | B1 | 8/2002 | Wobben | |
| 2006/0071649 | A1 | 4/2006 | De | |
| 2012/0057384 | A1* | 3/2012 | Jones | 363/126 |
| 2012/0113695 | A1* | 5/2012 | Chivite Zabalza et al. | 363/71 |

FOREIGN PATENT DOCUMENTS

| | | |
|---|---|---|
| CN | 1470098 A | 1/2004 |
| CN | 101031986 A | 9/2007 |
| JP | 2003333862 A | 11/2003 |
| WO | WO 0074198 A1 | 12/2000 |
| WO | WO 2008030919 A2 | 3/2008 |

* cited by examiner

*Primary Examiner* — Jeffrey Sterrett

(57) ABSTRACT

A method of adapting a configuration of a voltage converting device is provided. The voltage converting device includes a plurality of voltage converting units in parallel electrical connection to one another, and a plurality of inter-bridge transforming units. Each of the inter-bridge transforming units has a primary coil and a secondary coil. Each of the voltage converting units is electrically connected to a primary coil of a different one of the inter-bridge transforming units. The method includes detecting a status of at least one element of the group consisting of the voltage converting units and the inter-bridge transforming units. The method further includes adapting an activity state of the element based on the detected status of the element by moving the element from a first position to a second position.

13 Claims, 3 Drawing Sheets

METHOD OF ADAPTING A CONFIGURATION OF A VOLTAGE CONVERTING DEVICE AND VOLTAGE CONVERTING UNIT FOR A VOLTAGE CONVERTING DEVICE

CROSS REFERENCE TO RELATED APPLICATIONS

This application is the U.S. National Stage of International Application No. PCT/EP2009/062134, filed Sep. 18, 2009 and claims the benefit thereof. The International Application claims the benefits of U.S. provisional patent application No. 61/176,159 filed May 7, 2009. All of the applications are incorporated by reference herein in their entirety.

FIELD OF INVENTION

The invention relates to a method of adapting a configuration of a voltage converting device.

Further, the invention relates to a voltage converting unit for a voltage converting device.

BACKGROUND OF INVENTION

It is commonly known that a voltage converting device is used in power generation for matching the variable voltage characteristics of a power source or load to the nominally fixed voltage of the grid for the purpose of supplying power to the grid from a power source or taking power from the grid to a load. Such a voltage converting device may comprise at least a voltage converting unit and at least an inter-bridge transforming unit which is adapted to operate on the voltage outputted by the voltage converting unit and to output an output voltage to the grid. Providing a plurality of voltage converting units being electrically connected to the at least one inter-bridge transforming unit or to a plurality of inter-bridge transforming units may allow for increasing the output power rating of the voltage converting device. Adding more voltage converting units may also allow an increase in the effective switching frequency seen at the grid connection point without increasing the actual switching frequency used in the voltage converting unit(s).

However, if at least one element of the group consisting of the voltage converting units and the inter-bridge transforming units fails or shows a reduced functionality, further operation of the voltage converting device may be prevented until the element may be repaired or exchanged for a new one.

SUMMARY OF INVENTION

Therefore, it is an object of the invention to provide a method of adapting a configuration of a voltage converting device and a voltage converting unit for a voltage converting device which enables a continuous operation of the voltage converting device even in case one component of the voltage converting device at least partially fails.

In order to achieve the object defined above, a method of adapting a configuration of a voltage converting device and a voltage converting unit for a voltage converting device is provided.

According to an exemplary aspect of the invention, a method of adapting a configuration of a voltage converting device is provided, the voltage converting device comprising voltage converting units being in parallel electrical connection to one another and inter-bridge transforming units, wherein each of the inter-bridge transforming units comprises a primary coil and a secondary coil, wherein each of the voltage converting units is electrically connected to a primary coil of a different one of the inter-bridge transforming units, wherein the method comprises detecting a status of at least one element of the group consisting of the voltage converting units and the inter-bridge transforming units, and adapting an activity state of the element based on the detected status of the element by moving the element from a first position to a second position.

According to another exemplary aspect of the invention, a voltage converting unit for a voltage converting device is provided, the voltage converting device comprising voltage converting units being in parallel electrical connection to one another and inter-bridge transforming units, wherein each of the inter-bridge transforming units comprises a primary coil and a secondary coil, wherein each of the voltage converting units is electrically connected to a primary coil of a different one of the inter-bridge transforming units, wherein the voltage converting unit is electrically connectable to the primary coil of one of the inter-bridge transforming units, wherein the voltage converting unit is movable from a first position to a second position based on a detected status of the voltage converting unit such that an activity state of the voltage converting unit is adapted.

The term "status" may particularly denote any state in which the element, particularly the voltage converting unit, is properly functioning, not properly functioning or malfunctioning or comprises a reduced functionality. In particular, a status may comprise a failure state.

The term "activity state" may particularly denote a state in which the element, particularly the voltage converting unit, forms actively part of an electrical circuit provided by the inter-bridge transforming units and voltage converting units. In particular, the element being in the active state may participate in an operation of the overall voltage converting device.

The terms "first position" and "second position" may particularly denote a physical position of the element, particularly of the voltage converting unit, in which a normal operational state or mode or a non-normal operational state or mode of the element, particularly the voltage converting unit, and thus the voltage converting device may be enabled, respectively. Both terms may be mutually exchangeable to one another such that the first position may correspond to the normal or non-normal operational state of the element and the second position may correspond to the non-normal or normal operational state of the element, respectively.

The term "voltage converting units being in parallel electrical connection to one another" may particularly denote a (dc) input of the voltage converting units being in parallel electrical connection to one another, wherein an (ac) output connection of the voltage converting units may be connected through inter-phase transforming units or inter-bridge transforming units before forming a parallel connection (for each phase of the voltage converting units separately) to a grid.

According to the exemplary aspects of the invention as defined above, an activity state of at least one of the voltage converting units and/or at least one of the inter-bridge transforming units may be adapted in response to detecting a status of the at least one of the voltage converting units and/or the at least one of the inter-bridge transforming units. Thus, a reconfiguration of a voltage converting device may be provided such that a continuous operation of the voltage converting device may be enabled.

In particular, the voltage converting device may comprise voltage converting units being in parallel electrical connection to one another. Further, the voltage converting device may comprise inter-bridge transforming units or inter-phase transforming units, wherein each of the voltage converting units may be electrically connected to a related inter-bridge transforming unit. Each of the inter-bridge transforming units may comprise a primary coil and a secondary coil. The primary coil of an inter-bridge transforming unit may be electrically connected to the secondary coil of a subsequent inter-bridge transforming unit in the array (or of a first inter-bridge transforming unit in case of the last inter-bridge transforming unit), wherein a second connection of the secondary coil may be electrically connected in parallel with all other like connections of the other inter-bridge transforming units and so on to the grid connection.

In particular, detecting a malfunctioning state or a reduced functioning state of the element, particularly of the voltage converting unit, may cause the element to be moved from a position in which a normal operational state is enabled to a position in which a non-normal operational state is enabled, thereby the element becoming electrically inactive in the voltage converting device. Further, detecting a functioning state of the element, particularly of the voltage converting unit, may cause the element being incorporated into the voltage converting device such that the element may become electrically active. In this way, the element may be moved from a position in which the element may be in a non-normal operational state to a position in which the element may be in a normal operational state.

Moving the element from the first position to the second position may be accomplished by a relative displacement of the element to the voltage converting device. In particular, the relative movement of the element may be mediated by further elements such as an element mounting system of the voltage converting unit. Such a mounting system may comprise a manually or electrically operated screw jack being engageable with the element or may comprise an equivalent mechanical arrangement for moving the element from the first position to the second position. In particular, a motor unit such as a geared motor unit used for example as an electrical car seat positioning system may be used for moving the element, thus allowing for a very easy and low cost movement of the element.

In particular, at least a voltage converting unit and an inter-bridge transforming unit whose primary coil is electrically connected to the voltage converting unit may be moved from the first position to the second position.

The method and the voltage converting unit may allow for a time-saving and cost-saving operation of the voltage converting device, since the configuration of the voltage converting device may be immediately adapted to a detection of a status of the element, particularly of the voltage converting unit. In particular, a down time of the voltage converting device may be reduced or eliminated upon detecting a non-functioning state of the element, as the element is forced to become electrically inactive, while the remaining components of the voltage converting device may keep still being in operation. Further, in detecting the element comprising a proper functionality while being not in an active state in the voltage converting device, the element may be immediately forced into operation. In this way, a properly operating voltage converting device may be expanded in that a new element may be implemented, thus increasing the output power rating of the voltage converting device.

Further, the method and the voltage converting unit may allow for modularity in reconfiguring the voltage converting device upon detecting a status of the element, particularly of the voltage converting device. Further, an operation of the voltage converting device may be easily maintained upon simply moving the element from a first position to a second position.

Further, a rating of the output voltage of the voltage converting device may be adapted or controlled according to the changed activity state of the element. In particular, the power rating of the voltage converting device may scaled with the number of voltage converting units being in an activity state in that incorporating a further voltage converting unit into the voltage converting device may cause the power rating to be increased and electrically decoupling a voltage converting unit from the voltage converting device may cause the power rating to be decreased, respectively.

Next, further exemplary embodiments of the method of adapting a configuration of a voltage converting device may be explained. However, these embodiments also apply to the voltage converting unit for the voltage converting device.

The element may be one of the voltage converting units, wherein moving the one of the voltage converting units may comprise electrically disconnecting the one of the voltage converting units from the electrically connected primary coil of the one of the inter-bridge transforming units. Thus, a status of one of the voltage converting units may be detected, wherein the status of the voltage converting unit may comprise a malfunctioning state or a state of reduced functionality. The failed voltage converting unit may be caused to move from a position in which the voltage converting unit may be active to a position in which the voltage converting unit may be inactive, thereby forcing the failed voltage converting unit being electrically inactive. A repositioning of the voltage converting unit may comprise electrically disconnecting the voltage converting unit from the electrically connected inter-bridge transforming unit such that the number of voltage converting units of the voltage converting device may be reduced and an easy reconfiguration of the voltage converting device is enabled.

The primary coil of each one of the inter-bridge transforming units may be electrically connected to one secondary coil of another inter-bridge transforming unit, wherein moving the one of the voltage converting units may further comprise electrically bypassing the one of the inter-bridge transforming units. In particular, moving the one of the voltage converting units may further comprise electrically connecting the primary coil of another one of the inter-bridge transforming units which is electrically connected to the secondary coil of the one of the inter-bridge transforming units to a secondary coil of yet another one of the inter-bridge transforming units which is electrically connected to the primary coil of the one of the inter-bridge transforming units. Here, the inter-bridge transforming units of the voltage converting device may comprise a ring configuration or a cyclic cascade configuration, wherein each of the voltage converting units is electrically connected to the primary coil of a different one of the inter-bridge transforming units and a secondary coil of another one of the inter-bridge transforming units. Thus, a reconfiguration of the voltage converting device is achieved by electrically decoupling the one of the inter-bridge transforming units whose primary coil is electrically connected to the voltage converting unit (that is the one of the inter-phase transforming units is faulty or comprise a fault state or a failure state), and then the one of the inter-bridge transforming units may also turn inactive. Further, by introducing a bypass between the primary coil of the another one of the inter-bridge transforming units and the secondary coil of the yet another one of the inter-bridge transforming units may maintain a ring configuration of the remaining operational inter-bridge transforming units and voltage converting units, in which the primary coil of each one of the inter-bridge transforming units may be electrically connected to the secondary coil of another one of the inter-bridge transforming units. Thus, a continuous operation of the voltage converting device is maintained, wherein the output power of the voltage converting device may be reduced.

The secondary coil of each of the inter-bridge transforming units may be electrically connected to a common output of the voltage converting device, and particularly so on to the grid connection, wherein moving the one of the voltage converting units may further comprise electrically disconnecting the secondary coil of the one of the inter-bridge transforming units from the common output of the voltage converting device. In particular, this step may be not absolutely necessary, but may be subject to the inter-bridge transformer of the failed section not itself being faulty. The common output of the voltage converting device may be a common node of the voltage converting device, to which the secondary coil of each of the inter-bridge transforming units may be electrically connected. This measure may cause the one of the inter-bridge transforming units being decoupled from a common output of the voltage converting device such that no voltage may be fed via the one of the inter-bridge transforming units to the common output of the voltage converting device and falsifying or influencing an output voltage may be prevented.

The method may further comprise electrically disconnecting the voltage converting device from at least one of an energy source of the voltage converting device and a load of the voltage converting device before adapting the activity state of the element and electrically connecting the voltage converting device to at least one of the energy source of the voltage converting device and the load of the voltage converting device subsequent to adapting the activity state of the element. In particular, a load of the voltage converting device may comprise a grid or a supply network. By first separating the voltage converting device from an energy source and/or a load may prevent a damage of the voltage converting device resulting from an undesired voltage supply from the energy source to the voltage converting device during a reconfiguration of the voltage converting device. Further, supplying an undesired voltage output to the load may be prevented during reconfiguring the voltage converting device by disconnecting the voltage converting device before reconfiguring the voltage converting device.

The method may further comprise adapting a switching frequency of the voltage converting units based on the adapted activity state of the element. This measure may apply to electrically incorporating a further element to the voltage converting device or reducing the number of the electrically active elements of the group consisting of the voltage converting units and the inter-bridge transforming units. This measure may be particularly useful when maintaining a switching frequency of the voltage outputted by the common output of the voltage converting device. In particular, each of the voltage converting units whose switching frequency may be adapted based on the adapted activity state of the element may comprise an activity state. In particular, a switching frequency of the voltage converting units may be increased according to reducing the number of the elements of the group consisting of the voltage converting units and the inter-bridge transforming units by moving the element from a "normal mode of operation" position to a "bypass mode" position. Further, a switching frequency of the voltage converting units may be decreased by adding or electrically incorporating a further element to the configuration of the voltage converting device. In particular, the switching frequency of the voltage converting units may be adapted using a pulse width modulation device. In particular, the switching frequency of the voltage converting units may be simultaneously or successively adapted to one another.

The method may further comprise adapting a current outputted by the voltage converting units based on an operation temperature of the voltage converting device. Thus, by providing a control or adaptation which is partially based on a sensed temperature it may be possible to compensate for temperature variations, in particular for changes in the outputted current induced by temperature changes. In particular, switching losses of the voltage converting units being in an activity state may be increased or decreased and providing derating or increasing of the current outputted by the voltage converting units by providing a respective adaptation may compensate for an increased or decreased operation temperature of the voltage converting units.

Next, further exemplary embodiments of the voltage converting unit for a voltage converting device may be explained. However, these embodiments also apply to the method of adapting a configuration of a voltage converting device.

The voltage converting unit may comprise an output which is electrically connectable to the primary coil of the one of the inter-bridge transforming units upon the voltage converting unit being in the first position, particularly upon the voltage converting device being in only the first position. Thus, the voltage converting unit may (only) form part of the voltage converting device or be in an activity state, if the voltage converting unit is properly functioning. Thus, a very easy measure for adapting the activity state of the voltage converting unit may be provided.

The primary coil of each one of the inter-bridge transforming units may be electrically connected to one secondary coil of another one of the inter-bridge transforming unit, wherein the voltage converting unit may comprise a bypassing element for bypassing the one of the inter-bridge transforming units upon the voltage converting unit being in the second position, particularly upon the voltage converting unit being in only the second position. In particular, the bypass element may be electrically connectable to the secondary coil of another one of the inter-bridge transforming units being electrically connected to the secondary coil of the one of the inter-bridge transforming units and may be electrically connectable to the primary coil of yet another one of the inter-bridge transforming units being electrically connected to the primary coil of the one of the inter-bridge transforming units upon the voltage converting unit being in the second position, particularly upon the voltage converting unit being in only the second position. A bypass of the one of the inter-bridge transforming units may (only) be accomplished, if the voltage converting unit comprises a status, particularly a failure state, in terms of a malfunctioning state or reduced functioning state. Thus, reconfiguring the ring configuration or cyclic cascade configuration of the voltage converting device may be easily achieved by introducing the bypass of the one of the inter-bridge transforming units.

The voltage converting unit may comprise a connecting element for electrically connecting the secondary coil of the one of the inter-bridge transforming units to a common output of the voltage converting device upon the voltage converting unit being in the first position, particularly upon the voltage converting unit being in only the first position. Thus, the one of the inter-bridge transforming units may (only) be electrically connected to the common output and thus to the load of the voltage converting device, if the voltage converting unit properly functions. Thus no signal may arise in the signal path from the secondary coil of the one of the inter-bridge transforming units to the common output when the voltage converting unit may be in the second position, since the secondary coil of the one of the inter-bridge transforming units may be electrically disconnected from the common output. Thus, an undesired change of the output voltage or current of the voltage converting device may be prevented.

At least one of connecting element and the bypassing element may be designed as a knife contact. This embodiment of the connecting element and/or the bypassing element represents a very easy constructive design for allowing electrical connections. In particular, knife contacts, blade contacts or "messercontacts" may be easily engageable or disengageable with further electrical connections. Owing to the particular embodiment of the connecting element and/or the bypassing element the voltage converting unit may be recognized as rackable circuit breaker which may be connected to or racked to further electrical connections of the voltage converting device when the voltage converting unit may be in the first position and disconnected from or racked out the another components of the voltage converting device when the voltage converting device may be in the second position.

According to another exemplary aspect of the invention, a device and/or a method are provided which may allow the benefits of cyclic cascaded inverter modules to be realized when one or more of the inverter modules in the cyclic cascade array may be faulty or may have to be taken out of service.

Proposals from other wind turbine manufacturers show schemes such as that disclosed by Gamesa in their 2007 EPE paper, namely "A high power density converter system for the Gamesa G10x4,5 MW Wind turbine" (ISBN 9789075815108)" and "Parallel-connected converters for optimizing efficiency, reliability and grid harmonics in a wind turbine" (ISBN 9789075815108), which are incorporated herein by reference, with six parallel converter circuits wherein each parallel converter section may have separate generator winding, network reactor and circuit breakers capable of isolating faulty converter section(s).

Facilities for improved availability with power converters with IBT systems, in particular, how facilities for improved availability could be incorporated in a parallel connected converter system based on inter-bridge transformers (IBTs), may be explained in the following:

The advantage of a scheme proposed may be that the system may be reconfigured to continue to function, if one of the inverters fails.

The improved availability may result from the ability to disconnect one or more failed inverter modules from the power stack, and may keep the remaining "healthy" inverters running.

This may improve the availability of the wind turbine, as it may be able to stay connected to the grid albeit at a reduced power level.

In a system with IBT's, some issues may need to be considered.

If one inverter is turned off and the two IBTs connected to this inverter are left in the circuit, these IBTs may saturate. Due to the ring configuration of the IBTs, the fault may spread to the remaining phases, so preventing further operation.

To prevent this, an entire IBT assembly may need to be bypassed, if the power throughput capability of the remaining inverters is to be made available.

The IBTs of a multi-parallel inverter configuration may be arranged in what may be called a "cyclic cascade".

In the scheme proposed, each inverter module may be associated with a three phase IBT assembly. The IBTs may be connected together in the cyclic cascade arrangement.

The scheme may operate correctly when all inverter modules may be healthy.

Should one inverter may become faulty, then that inverter may have to be removed from the scheme and a cyclic cascade arrangement of 3×3 phase inverter modules may have to be established by the bypass of the now un-necessary IBT.

In the following, a normal arrangement with four inverter modules connected in cyclic cascade may be described. To simplify the explanation, only one phase of the three phase scheme may be described.

The inverter module may include all the necessary inter-connections for its normal mode of operation and its bypassed mode.

To allow this changeover from normal to bypass mode to be achieved by remote control, it may be then proposed that the inverter module or its mounting system may include a screw-jack or equivalent mechanical arrangement to move the inverter module from its operational position to its bypass position. A simple low cost geared motor unit such as that used on an electric car seat positioning may provide the means for this movement.

The electrical connections in the inverter for the normal operational mode connections and the bypass mode connections may be arranged as "knife contacts" ("messerkontakt").

The changeover from operational to bypass modes may have be carried out with all the inverters de-energised from all energy sources including the network voltage, the generator and the dc link voltage.

Following changeover from normal operation to bypass modes, then the whole system may be re-energised and may be brought back into service.

The PWM arrangement for the cyclic cascade arrangement may be either a bus clamped arrangement based on sequentially selecting inverter outputs to be high or low depending on the output voltage requirement, and pulse width modulating only one of the paralleled inverters, or a phase shifted PWM arrangement with PWM patterns being supplied to all of the paralleled inverters. Both techniques may be well known from the literature.

Taking the example of the phase shifted PWM arrangement, for four inverters in cyclic cascade, the PWM patterns may be 90 degrees electrically phase shifted from each other, so for a switching frequency of say about 2.5 kHz, the PWM carrier wave of inverter No. 2 may be offset by about 100 μs from inverter No. 1 and so on in the cascade arrangement. The resultant harmonics seen at the commoning node or common node of the IBTs (network in this example) may be about 4×2.5 kHz=10 kHz.

When the bypass mode with three inverters in cyclic cascade may be enabled, the PWM of operational inverter No. 1 may have to be offset by about 133 μs be from the next operational inverter and so on. The resultant harmonics then seen at the commoning node may be then about 3×2.5 kHz=7.5 kHz.

If there is a requirement to maintain a consistent harmonic profile to the commoning node, then the switching frequency of each inverter in the cascade arrangement may have to be modified, as the number in cascade may be changed. So for three in cascade and a requirement to maintain commoning node harmonics at about 10 kHz, then a PWM frequency for each inverter may have to be about 10 kHz/3=3.3 kHz, so the PWM of operational inverter No. 1 may have to be offset by about 100 μs from the next operational inverter and so on.

Maintaining a consistent harmonic profile at the commoning mode may have to be important, if tuned filters are connected in shunt with this node to minimize the emission of PWM related harmonics to the network.

Such increase in switching frequency may cause an increase in switching losses, and if the inverter system is operating at or near to its maximum operating temperatures, some de-rating of the load current may be required. For applications such as wind turbines, it may be very rare that the maximum rated temperature may be present, so a temperature dependent de-rate of the load current may be managed.

In the following, the principle of a redundancy may be described. If one inverter "B" fails, then an IBT "N1B" may be bypassed either by a set of breakers or a mechanical device shifting the inverter as described.

The result of this may be the following:

IBT "N1B" may be disconnected from inverters "N1A" and "N1B".

IBT "N1A" may connect to IBT "N1C"; hence the cyclic cascade configuration may be not violated and may change from a cascade of four to a cascade of three inverter modules/IBT's.

The inverter system may be still able to re-connect to the grid and may output approximately ¾ of the rated power.

Changes in leakage inductance and modulation strategy due to a redundancy feature may be described in the following:

It may have been proposed that the leakage inductance of the IBT's may be to be designed such that the total leakage inductance may replace the network reactor.

One may assume an arrangement of four inverters and four IBT's.

If one IBT is removed, the total leakage inductance may be raised to ⁴⁄₃ of the original value.

Conclusively, the improved availability feature may enable the array of healthy inverter modules forming the power converter to re-connect to the network (or load), if one inverter module fails.

The improved availability feature may be achieved by the bypass of each faulty inverter module and its corresponding IBT assembly. Here, one assembly may be defined as three IBTs, one connected to each inverter phase (U, V, W).

The effects of the improved availability feature may be the following:

An effect may be a reduced power output, although with temperature dependent de-rate/rerate.

Further, an effect may be an improved availability.

Further, an effect may be pro-rata increase in leakage inductance.

Further, a modification to the PWM modulator may be required. These modifications may be:

A modification may be an increase in a switching frequency, as the number of operational inverters may reduce to ensure that any tuned filters may continue to dampen the harmonics associated with the PWM frequency.

Further, a modification may be that a change in carrier phase shift to accommodate the number of electrically active inverters.

Further, a modification may be the carrier phase shift and the increase in frequency may be matched, such that the maximum allowed flux linkage may be not violated.

Further, an effect may be that an ambient temperature dependent reduction in power output may be required due to increased switching losses.

Arranging the inverter module, as if it is a rackable circuit breaker with features on the inverter module to be connected in (racked to) the electrically active mode (operational) and de-activated mode (racked out) (non-operational) and still retaining the cyclic cascade arrangement of remaining operational inverters by the bypass of the non-required IBT may be accomplished.

The scheme may also achieve its bypass capability by arranging the IBT itself as a rackable device such that the IBT may have two positions—racked in, not bypassed, IBT and associated inverter operational; racked out, bypassed, IBT and associated inverter not operational.

BRIEF DESCRIPTION OF THE DRAWINGS

The aspects defined above and further aspects of the present invention are apparent from the examples of embodiments to be described hereinafter and are explained with reference to the examples of embodiment. The invention will be described in more detail hereinafter with reference to examples of embodiment but to which the invention is not limited.

DETAILED DESCRIPTION OF INVENTION

Figure 1:
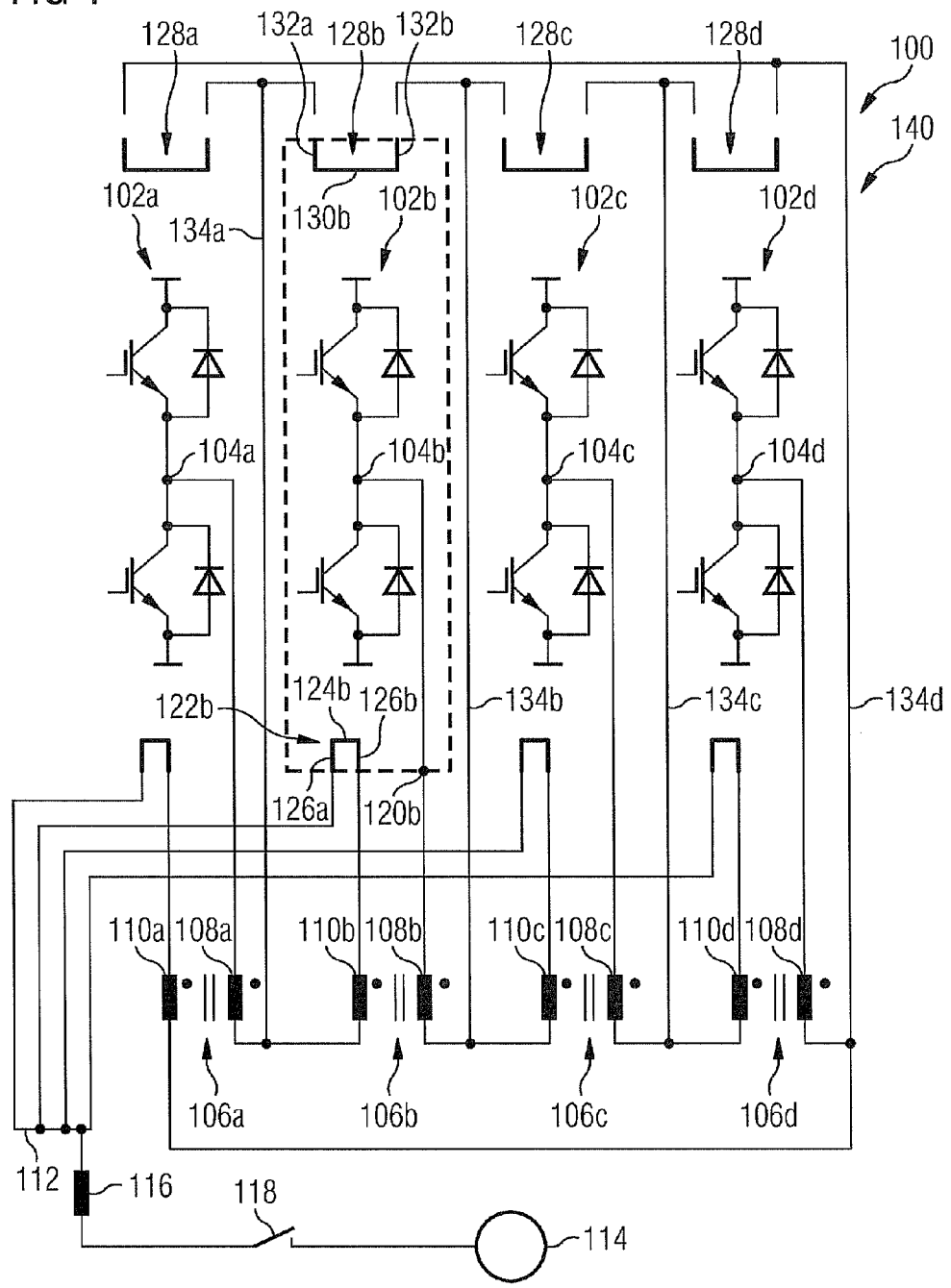
FIG. 1 illustrates a voltage converting device comprising a voltage converting unit being in a first position.
Figure 2:
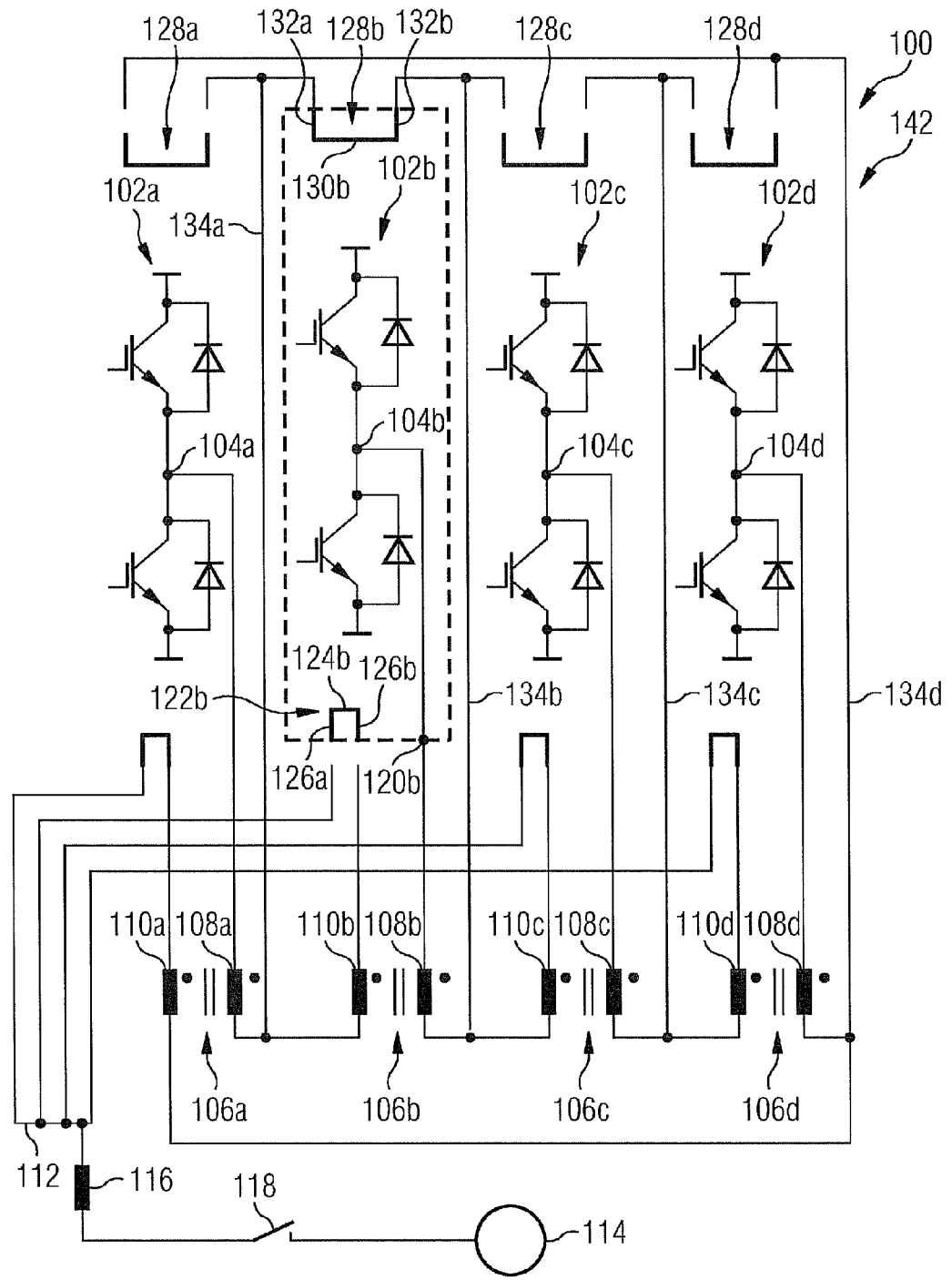
FIG. 2 illustrates the voltage converting unit in FIG. 1 comprising the voltage converting unit being in a second position.

Referring to FIG. 1, a voltage converting device 100 is shown which is used in power generation, particularly in wind power generation. The voltage converting device 100 may be interconnected between a generator for converting mechanical energy into electrical energy and a grid for supplying electrical power to users.

The voltage converting device 100 comprises four voltage converting units 102a-d, each of which comprises a transistor and a rectifying diode. The voltage converting units 102a-d are arranged in parallel electrical connection to one another. Each one of the voltage converting units 102a-d comprises an output 104a-d which is electrically connected to a different one of four inter-bridge transforming units 106a-d.

Each one of the inter-bridge transforming units 106a-d comprises primary and secondary coils 108a-d, 110a-d which are only magnetically coupled to one another via a magnetic core member (not shown). The primary coil 108a-d of each one of the inter-bridge transforming units 106a-d is electrically connected to a different one of the outputs 104a-d of the voltage converting units 102a-d. Further, the primary coil 108a-d of each one of the inter-bridge transforming units 106a-d is electrically connected to the secondary coil 110a-d of another one of the inter-bridge transforming units 106a-d. Further, the secondary coil 110a-d of each one of the inter-bridge transforming units 106a-d is electrically connected to a common output 112 of the voltage converting device 100.

The common output 112 of the voltage converting device 100 is connected to a load 114, in particular to a power grid or network, by means of an inductance 116 and a switch 118.

Each one of the voltage converting units 102a-d is identically designed to one another. In the following, the voltage converting unit 102b as indicated by the dashed lines in FIG. 1 will be explained in more detail.

The voltage converting unit 102b comprises an output port 120b which is arranged at a housing (not shown) of the voltage converting unit 102b and is electrically connected to the output 104b. Further, the voltage converting unit 102b comprises a connecting element 122b in the form of a knife contact 124b comprising two pins 126a, b. A first pin 126a of the knife contact 124b is electrically connectable to the secondary coil 110b of the inter-bridge transforming unit 106b. A second pin 126b of the knife contact 124b is electrically connectable to the common output 112. Further, the voltage converting unit 102b comprises a bypass element 128b which is designed as a knife contact 130b of two pins 132a, b. The first pin 132a, b is electrically connectable to the secondary coil 110b of the inter-bridge transforming unit 106b and to the primary coil 108a of the inter-bridge transforming unit 106a via a bypass line 134a. The second pin 132b of the bypassing element 128b is connectable to the primary coil 108b of the inter-bridge transforming unit 106b and to the secondary coil 110c of the inter-bridge transforming unit 106c via a bypass line 134b.

Similarly, the voltage converting unit 102a is electrically connectable to the inter-bridge transforming units 106b, d via a bypass element 128a, the bypass line 134a and a bypass line 134d, the voltage converting unit 102c is electrically connectable to the inter-bridge transforming units 106b, d via a bypass element 128c, the bypass lines 134b and a bypass line 134c, and the voltage converting unit 102d is electrically connectable to the inter-bridge transforming units 106a, c via a bypass element 128d and the bypass lines 134c, d, respectively.

In order to account for a failure of the voltage converting unit 102b, the voltage converting unit 102b is designed to be movable from a first position 140 to a second position 142 such that the voltage converting unit maintains its operation. The first and second positions 142, 144 of the voltage converting unit 102b are shown in FIG. 1, 2, respectively.

In the first position, the output 104b of the voltage converting unit 102b is electrically connected to the inter-bridge transforming unit 106b such that the voltage converting unit 102b comprises an electrical active state. Therefore the voltage converting unit forms part of an electrical circuit provided by the voltage converting device 100. The inter-bridge transforming unit 106b is electrically connected to the common output 112 in that the connecting element 122b of the voltage converting unit 102b is electrically connected to the secondary coil 110b of the inter-bridge transforming unit 106b and to the common output 112 of the voltage converting device 100. The inter-bridge transforming units 106a, c are electrically disconnected from one another in that the bypass elements 128b does not connect the bypass lines 134a, b to one another.

In the second position 142, the voltage converting unit 102b is electrically disconnected from the inter-bridge transforming units 106b, c. Further, the inter-bridge transforming unit 106b is bypassed. The primary coil 106b of the inter-bridge transforming unit 106b is electrically disconnected from the output 104b of the voltage converting unit 102b. Further, the secondary coil 110b of the inter-bridge transforming unit 106b is electrically disconnected from the connecting element 122b of the voltage converting unit 102b and thus from the common output 112. The bypass element 128b electrically connects the bypass lines 134a, b to one another such that the primary coil 108a of the inter-bridge transforming unit 106a is electrically connected to the secondary coil 110c of the inter-bridge transforming unit 106c. Thus, the voltage converting unit 102b is in an electrically inactive state.

The bypass lines 134a-d may be part of the voltage converting device 100 or may be independent wiring connections not belonging to the voltage converting device 100.

Figure 3A:
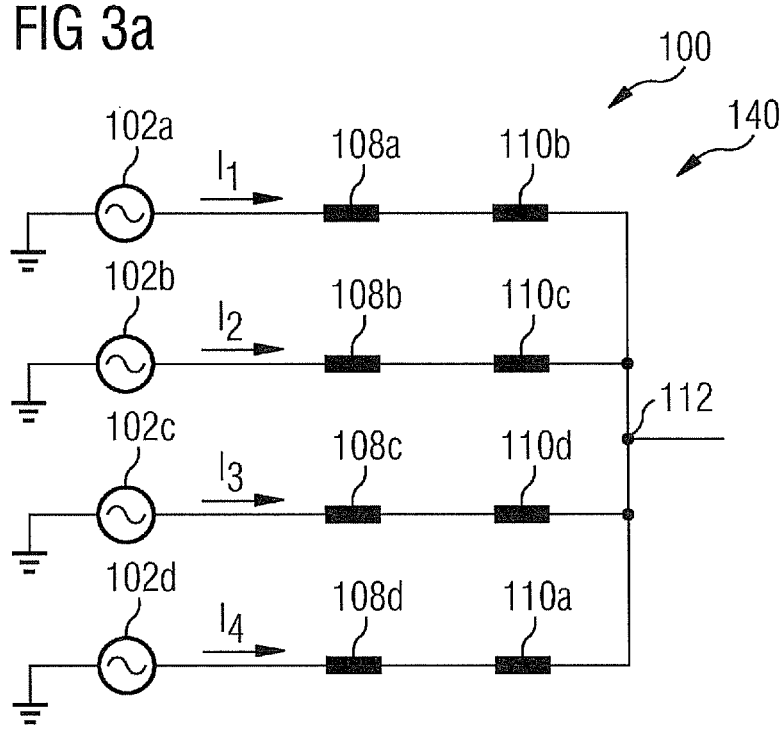
FIG. 3a, b illustrate electrical equivalents of the voltage converting devices in FIG. 1, 2.

Referring to FIG. 3a, an electrical equivalent of the voltage converting device 100 is shown with the voltage converting unit 102b being in the first position 140. Each of the voltage converting units 102a-d is connected to the common output 112 of the voltage converting device 100 via a primary coil 108a-d and a secondary coil 110a-d of two inter-bridge transforming units 106a-d. For instance, the voltage converting unit 102a is connected to the common output 112 via the primary coil 108a of the inter-bridge transforming unit 106a and the secondary coil 110b of the inter-bridge transforming unit 106b.

Assuming each one of the primary and secondary coils 108a-d, 110a-d being identical to one another, leakage inductances of the primary and secondary coils 108a-d, 110a-d are also identical to one another.

Figure 3B:
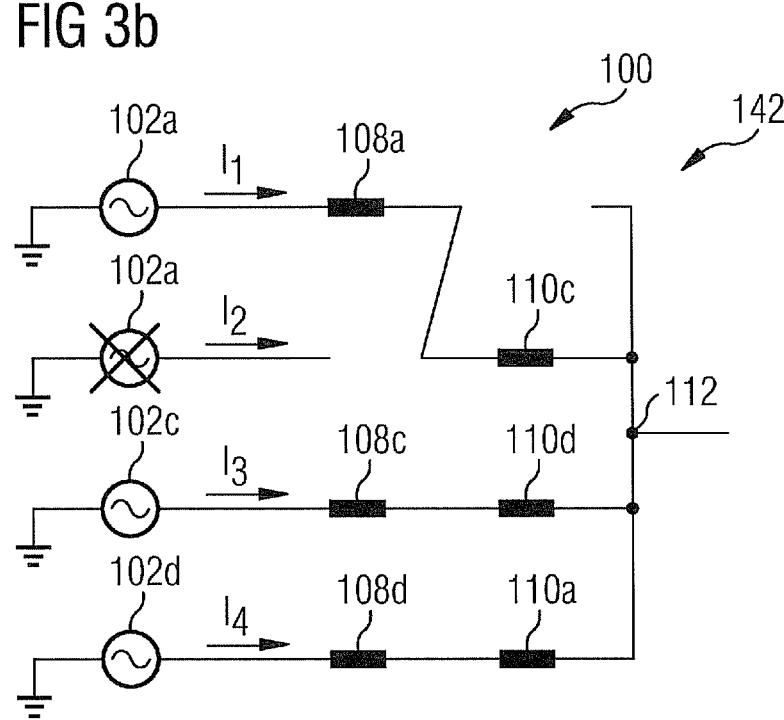

Referring to FIG. 3b, an electrical equivalent of the voltage converting device 100 is shown with the voltage converting unit 102b being in the second position 142. Thus the primary and secondary coils 108, 110b of the inter-bridge transforming unit 106b are bypassed and an electrical connection between the primary coil 108a of the inter-bridge transforming unit 106a and the secondary coil 110c of the inter-bridge transforming unit 106c is provided. For representation purposes, the primary and secondary coils 108b, 110b of the inter-bridge transforming unit 106b are omitted and the voltage converting unit 102b is crossed out. Thus a cyclic cascade arrangement of the inter-bridge transforming units 106a, c, d is maintained despite the bypass of the inter-bridge transforming unit 106b.

According to normal rules of paralleled electrical circuits, the leakage inductance of the inter-bridge transforming units 106a, c, d are 4/3 of the leakage inductance of the voltage converting unit 100 as shown in FIG. 3a.

In the following, a method of adapting a configuration of the voltage converting device 100 is explained. In particular, the method is adapted to reconfigure the voltage converting device 100 upon a failure of the voltage converting unit 102b.

Status, particularly failure states, of the voltage converting units 102a-d and the inter-bridge transforming units 106a-d are detected. If a failure of the voltage converting unit 102b is detected, the voltage converting device 100 is disconnected from an energy source, particularly from a generator which is connected to a wind turbine. Further, the voltage converting device 100 is disconnected from the grid 114 via the switch 118.

Next, the voltage converting unit 102b is moved from the first position 140 to the second position 142 such that the inter-bridge transforming unit 106b is disconnected from the voltage converting unit 102b and from the common output 112, and the inter-bridge transforming units 106a, c are electrically connected to one another, respectively.

Next, the voltage converting device 100 is reconnected to the energy source and to the grid 114.

Next, switching frequencies of the voltage converting units 102a, c, d are adapted based on the reduced number of voltage converting units 102a-d. A PWM arrangement is provided for the voltage converting device 100 which supplies a PWM pattern to the voltage converting units 102a-d. In the first position 140 of the voltage converting unit 102b, the switching frequency of the voltage converting units 102a-d are by 90 degree phase shifted to one another, wherein an individual switching frequency is 2.5 kHz. Thus a carrier wave of the each one of the voltage converting units 102a-d is offset by 100 μs relative to one another. The resultant harmonics seen at the common output 112 of the inter-bridge transforming units 106a-d corresponds to 4*2.5 kHz=10 kHz. In the second position 142 of the voltage converting unit 102b, a PWM frequency of each of the voltage converting units 106a, c, d is adapted to be 10 kHz/3=3.3 kHz, in order to maintain the switching frequency of 10 kHz at the common output 112. Further, the switching frequencies are offset by 100 μs to one another. Assuming no adaption of the switching frequencies for maintaining the constant output switching frequency, the switching frequencies of the voltage converting units 102a, c, $d$ are offset by 133 μs to one another, with on output switching frequency equaling to 3*2.5 kHz=7.5 kHz.

Adapting the switching frequencies may also be performed before reconnecting the voltage converting device 100 to the energy source and the grid 114.

Further, a temperature dependent derating of the current outputted by the voltage converting units 102a, c, d may be performed. This de-rate may be performed when the voltage converting unit 100 is decoupled from the energy source and the grid 114 or after a reconnection to the energy source and the grid 114.

The invention claimed is:

1. A method of adapting a configuration of a voltage converting device, the voltage converting device comprising a plurality of voltage converting units in parallel electrical connection to one another and a plurality of inter-bridge transforming units, wherein each of the inter-bridge transforming units comprises a primary coil and a secondary coil, wherein each of the voltage converting units is electrically connected to a primary coil of a different one of the inter-bridge transforming units, the method comprising:
    detecting a status of at least one element of the group consisting of the plurality of voltage converting units and the plurality inter-bridge transforming units, and
    adapting an activity state of the element based on the detected status of the element by moving the element from a first position to a second position.

2. The method of claim 1, wherein the element is one of the voltage converting units, wherein moving the one of the voltage converting units comprises electrically disconnecting the one of the voltage converting units from the electrically connected primary coil of one of the inter-bridge transforming units.

3. The method of claim 2, wherein the primary coil of each one of the inter-bridge transforming units is electrically connected to one secondary coil of another inter-bridge transforming unit, wherein moving the one of the voltage converting units further comprises electrically bypassing the one of the inter-bridge transforming units.

4. The method of claim 2, wherein the secondary coil of each of the inter-bridge transforming units is electrically connected to a common output of the voltage converting device, wherein moving the one of the voltage converting units further comprises electrically disconnecting the secondary coil of the one of the inter-bridge transforming units from the common output of the voltage converting device.

5. The method of claim 1, further comprising electrically disconnecting the voltage converting device from at least one of an energy source of the voltage converting device and a load of the voltage converting device before adapting the activity state of the element and electrically connecting the voltage converting device to at least one of the energy source of the voltage converting device and the load of the voltage converting device subsequent to adapting the activity state of the element.

6. The method of claim 1, further comprising adapting a switching frequency of the voltage converting units based on the adapted activity state of the element.

7. The method of claim 1, further comprising adapting a current outputted by the voltage converting units based on an operation temperature of the voltage converting device.

8. A voltage converting unit for a voltage converting device, the voltage converting device comprising a plurality of voltage converting units in parallel electrical connection to one another and a plurality of inter-bridge transforming units, wherein each of the inter-bridge transforming units comprises a primary coil and a secondary coil,
    wherein the voltage converting unit is electrically connected to a primary coil of a different one of the inter-bridge transforming units,
    wherein the voltage converting unit is electrically connectable to the primary coil of one of the inter-bridge transforming units,
    wherein the voltage converting unit is movable from a first position to a second position based on a detected status of the voltage converting unit such that an activity state of the voltage converting unit is adapted.

9. The voltage converting unit of claim 8, wherein the voltage converting unit comprises an output which is electrically connectable to the primary coil of the one of the inter-bridge transforming units upon the voltage converting unit being in the first position.

10. The voltage converting unit of claim 8, wherein the primary coil of each one of the inter-bridge transforming units is electrically connected to one secondary coil of another inter-bridge transforming unit, wherein the voltage converting unit comprises a bypassing element for bypassing the one of the inter-bridge transforming units upon the voltage converting unit being in the second position.

11. The voltage converting unit of claim 10, wherein at least one of connecting element and the bypassing element is designed as a knife contact.

12. The voltage converting unit of claim 8, wherein the voltage converting unit comprises a connecting element for electrically connecting the secondary coil of the one of the inter-bridge transforming units to a common output of the voltage converting device upon the voltage converting unit being in the first position.

13. A voltage converting device, comprising:
    a plurality of voltage converting units in parallel electrical connection to one another, and
    a plurality of inter-bridge transforming units, wherein each of the inter-bridge transforming units comprises a primary coil and a secondary coil,
    wherein each of the voltage converting units is electrically connected to a primary coil of a different one of the inter-bridge transforming units,
    wherein said each voltage converting unit is electrically connectable to the primary coil of one of the inter-bridge transforming units, and
    wherein the said each voltage converting unit is movable from a first position to a second position based on a detected status of the voltage converting unit such that an activity state of the voltage converting unit is adapted.

* * * * *